No. 805,068. PATENTED NOV. 21, 1905.
H. K. HITCHCOCK.
FEEDING GLASS.
APPLICATION FILED JUNE 13, 1904.

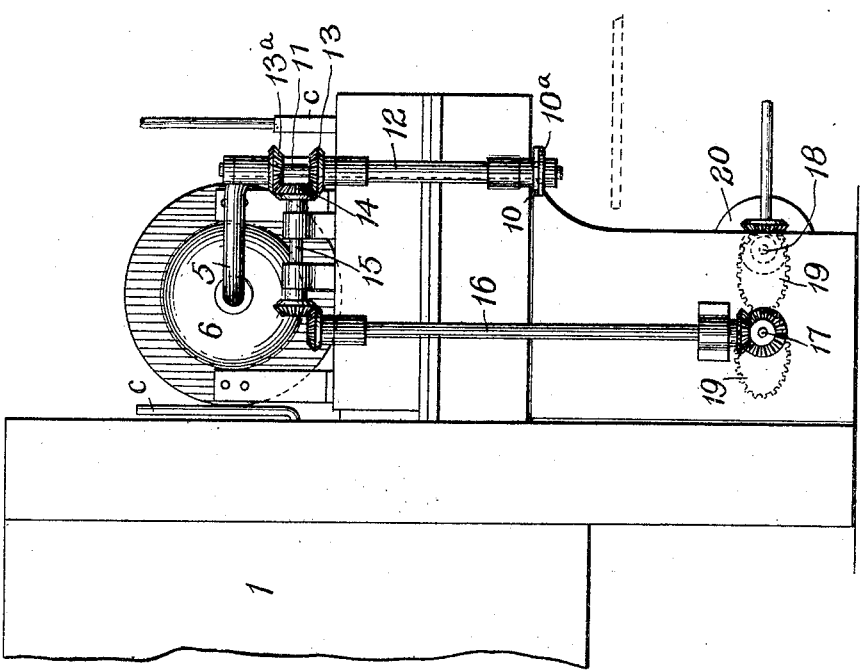

2 SHEETS—SHEET 2.

WITNESSES:
Herbert Bradley.
Fred Kirchner.

INVENTOR
Halbert K. Hitchcock,
by Christy & Christy Atty's

UNITED STATES PATENT OFFICE.

HALBERT K. HITCHCOCK, OF WALTON, PENNSYLVANIA, ASSIGNOR TO HIMSELF AND CHARLES W. BROWN, TRUSTEES, OF PITTSBURG, PENNSYLVANIA.

FEEDING GLASS.

No. 805,068.  Specification of Letters Patent.  Patented Nov. 21, 1905.

Application filed June 13, 1904. Serial No. 212,355.

*To all whom it may concern:*

Be it known that I, HALBERT K. HITCHCOCK, a citizen of the United States, residing at Walton, in the county of Allegheny and State of Pennsylvania, have invented or discovered certain new and useful Improvements in Feeding Glass, of which improvements the following is a specification.

The invention described herein relates to certain improvements in the feeding of glass from a tank, furnace, or other suitable reservoir to molds or other shaping devices.

Molten glass resembles liquids in the manner of movement through and from an orifice— *i. e.*, it is dependent, with a given fluidity, upon the pressure on the supply-body and the size of the orifice. By suitably regulating these the molten glass can be made to discharge drop by drop, and from a given orifice, with a given fluidity of glass, the quantity of glass in the drops can be varied within certain limits by varying the pressure on the supply-body—*i. e.*, the greater the pressure the larger the drops. By reason of the tenacity of the glass even when quite liquid the drops will be connected with each other and with the supply-body by a thin thread, which will harden more quickly than the drops, and unless such thread is severed before extending far from the supply-body and remelted it will be incorporated in such form in the next drop formed as to render the latter undesirable for use in the formation of an article.

The present invention has for its object a construction whereby it is possible to effect a step-by-step, or, as it might properly be termed, a "drop-by-drop," feed of the glass, each "drop" containing any desired quantity of glass and to provide for the remelting of solid or partially-solidified portions of glass formed in or adjacent to the discharge-orifice between adjacent drops or during any interruption of the feed of the glass from the tank or containing vessel.

The invention is hereinafter more fully described and claimed.

Figure 4:
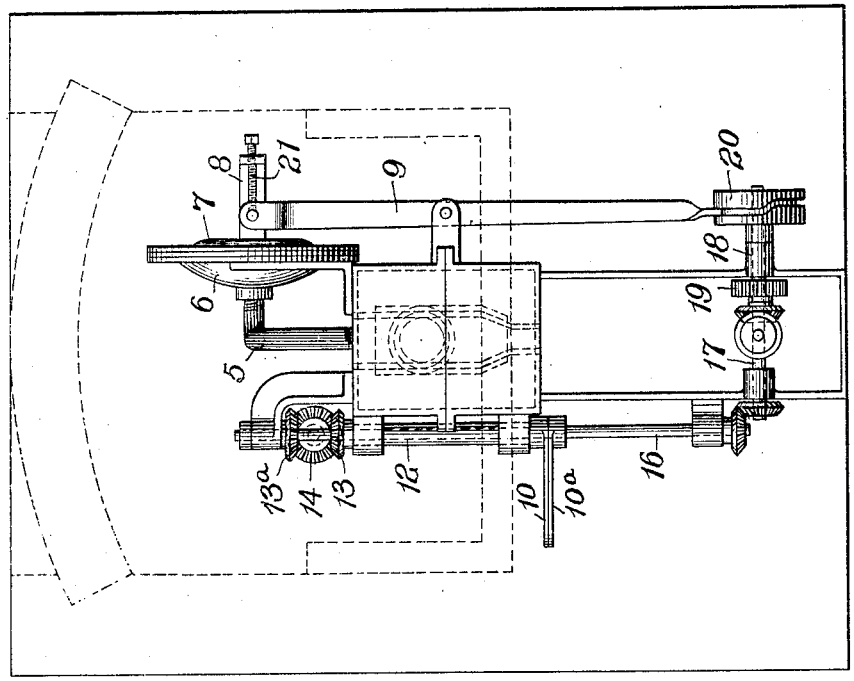
Figure 3:
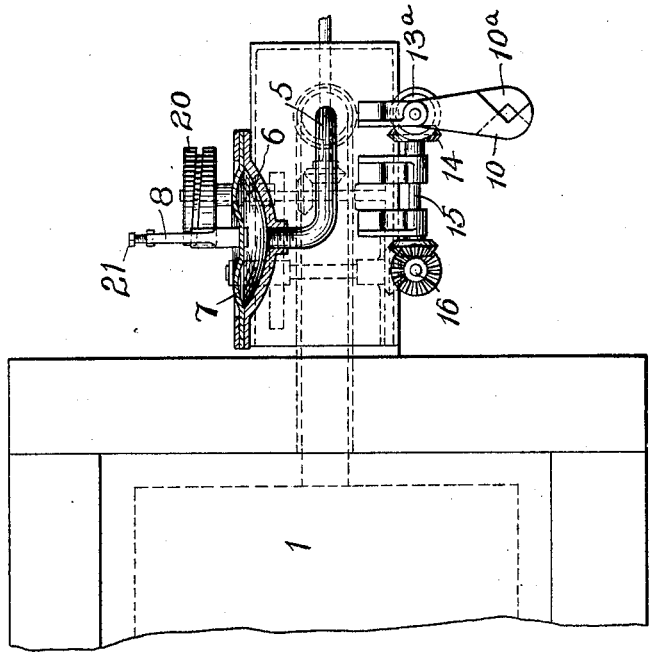

In the accompanying drawings, forming a part of this specification, Figure 1 is a side elevation of a portion of a furnace having my improved feed mechanism applied thereto. Fig. 2 is a sectional elevation of the same. Fig. 3 is a top plan view showing a portion of the exhaust apparatus in section, and Fig. 4 is an end elevation.

In the practice of my invention my improvements are applied to any suitable form of construction of tank, furnace 1, or other receptacle in which sufficient heat may be maintained to keep the glass in the desired condition of plasticity. From this tank or vessel extends a passage 2, communicating at its outer end with a transverse and preferably vertical passage 3, having its discharge-outlet at its lower end, and having at its upper end a vacuum-chamber 4, connected by pipe 5 to a suitable exhaust device whose operation can be readily controlled. In the form of apparatus shown it is preferred to maintain the glass in the tank at a level above the passage 2. A desirable form or construction of such exhaust device consists of a concave-convex metal shell 6, to the edges of which is secured a flexible diaphragm 7. This diaphragm is connected, preferably at its central point, to an arm 8, which in turn is connected to one end of a lever 9, whereby to shift the diaphragm in and out, thereby creating and destroying a partial vacuum in the chamber 4 and the passages 2 and 3 connected thereto. As will be readily understood by those skilled in the art, if while the glass is flowing freely through the passages 2 and 3 from the outlet the diaphragm 7 should be drawn suddenly outward a certain vacuum will be produced, so that atmospheric pressure acting on the glass in the passage 3 will force the glass backwardly into said passage and chamber 4, the walls of which are heated by any suitable means.

A desirable construction for maintaining the passages 2 and 3 at a temperature at least equal to that of molten glass is clearly shown in Fig. 2. The passages are lined with a highly-refractory material, as carborundum, and this lining $a$ is surrounded by granulated carbon $b$, which is electrically connected to terminals $c$ and they in turn to a suitable generator.

In feeding the glass into a mold or other receptacle suitable means are provided whereby when a sufficient quantity has been placed in the mold the glass between the discharge-orifice and the mold is severed and the direction of movement of glass at the discharge-orifice may be reversed, so that the glass between the orifice and the shears at the time of their operation may be drawn back and its plasticity restored in the passage. A suitable construction for severing the glass consists of two shear-blades 10 and 10ª, one of which is secured to a shaft 11 and the other to a sleeve 12, surrounding the shaft. These blades are secured in such angular relation to each other on the shaft and sleeve that when rotating they will pass each other at diametrically opposite points, one of the points corresponding to or lying in the axis of the passage 3, from which the glass exudes. The sleeve and shaft are rotating in opposite directions by any suitable means—such, for example, as that shown, consisting of two beveled gears 13 and 13ª, mounted, respectively, on the sleeve and shaft and engaging a corresponding pinion 14 on a counter-shaft 15. This shaft is driven by vertical shaft 16 and it in turn by shaft 17 through suitable interposed gearing. As it is desired that the shear-blades should have a quick movement at the time of severing the glass, while at other times they may have a slower movement, the shaft 17 is driven from the shaft 18 by means of elliptical gearing 19, as shown.

When feeding the glass to molds where the latter are presented or brought into line with the outlet from the furnace or chamber at regular predetermined intervals, it is preferred that the operation of the exhaust mechanism should occur at similar equal predetermined intervals and immediately subsequent upon the operation of the shear-blades. To this end a cam 20 on the power-shaft 18 is employed to operate the lever 9. As the operation of the shear-blades is effected from the power-shaft, it follows that by a suitable adjustment of the mechanisms described the shearing operation and the drawing up of the glass into the feed-passage can be made to occur in any desired order and at any desired time. The movement of the diaphragm can be regulated in any suitable manner—as, for example, by means of the screw 21, as shown in Fig. 4.

The quantity of glass required to form any desired article having been determined, the pressure-regulating mechanism is adjusted so that the normal pressure on the glass will cause the formation of drops or globular bodies of the required size and at the desired rate just below the outlet from passage 3. The term "globule" as herein employed is not used to define any particular shape or configuration of the glass, but only as defining a portion of glass which under the action of gravity will separate itself from any other supported portion. The shape the glass assumes in the practice of my method is similar to that assumed by glass dropping from a punty in the usual glass gathering and feeding operation. After each drop has been formed and fallen below the shears the latter operate to sever the thread connecting the drop and body of glass. The portion of the thread connected to the drop will contract toward the drop and be absorbed thereby, while the other portion of the thread will be drawn by the operation of the exhaust mechanism into the passage 3 and there remelted or prevented from solidifying. The operation of the shears should be so timed as to sever the thread as close as possible to the supply-body.

It is characteristic in the operation described that if the diaphragm were not to be operated the natural flow of glass would tend to form a drop as it exudes from the orifice 3ª, and if severed when formed the force of cohesion will draw that part of the thread adhering to the main body up into the main portion or supply, thus forming the lower surface for the next drop, so that a series of drops will follow one another at given intervals dependent upon the various natural forces operating thereon. If, however, the diaphragm 7 is operated at a time of severing the drop to reduce the pressure in the chamber 4, the flow of glass through passage 2 is accelerated and the glass at orifice 3ª is drawn completely up into the zone of heat, so that cooler portions are again reheated. Upon a reverse movement of the diaphragm, whereby pressure is increased in chamber 4, a rapid expulsion of the glass which has accumulated will occur, thereby causing the formation of a drop, large or small, depending upon the rapidity of the movement of the diaphragm at the orifice.

The invention described herein is not limited as regards the broad terms of the claims to any particular construction or arrangement of mechanical devices whereby a vacuum higher or lower is applied to the glass flowing from the furnace so as to arrest such normal flow and to pull back any glass which may have exuded from the discharge-outlet.

It is characteristic of the invention described herein that the feed of the glass can be controlled—$i.\ e.$, decreased or reversed—by varying the atmospheric pressure on the glass before it escapes from the outlet, and hence it is immaterial except as regards constructing and operating the controlling mechanism on what portion of the surface of the glass—$i.\ e.$, within the tank or the passage leading therefrom—the pressure is varied.

I claim herein as my invention—

1. As an improvement in the art of feeding glass to shaping mechanism, the method herein described, which consists in causing the glass to assume a globular form as it passes from the feed-orifice to the shaping mechanism and then detaching the globule or drop from the supply-body, substantially as set forth.

2. As an improvement in the art of feeding glass, the method herein described, which consists in causing the glass to assume a globular form of predetermined size or weight, as it passes from the feed-orifice and then detaching the globule or drop from the supply-body, substantially as set forth.

3. As an improvement in the art of feeding glass, the method herein described, which consists in causing the glass to assume a globular form as it passes from the feed-orifice, and then reversing the direction of movement of the glass at the orifice, substantially as set forth.

4. As an improvement in the art of feeding glass, the method herein described which consists in causing a full flow of the glass through a suitable orifice and then checking such flow or feed movement of the glass by reducing the pressure on the glass at some point within the orifice below atmospheric pressure, substantially as set forth.

5. As an improvement in the art of feeding glass, the method herein described which consists in causing the glass to flow through a suitable orifice and then reversing the feed movement through such orifice by reducing the pressure on the glass below atmospheric pressure at some point within the orifice, substantially as set forth.

In testimony whereof I have hereunto set my hand.

HALBERT K. HITCHCOCK.

Witnesses:
  DARWIN S. WOLCOTT,
  F. E. GAITHER.